United States Patent
Hernandez Esteban

(10) Patent No.: US 9,613,453 B2
(45) Date of Patent: Apr. 4, 2017

(54) SYSTEMS AND METHOD FOR PERFORMING A THREE PASS RENDERING OF IMAGES

(75) Inventor: Carlos Hernandez Esteban, Kirkland, WA (US)

(73) Assignee: Google Inc., Mountain View, CA (US)

( * ) Notice: Subject to any disclaimer, the term of this patent is extended or adjusted under 35 U.S.C. 154(b) by 1351 days.

(21) Appl. No.: 13/455,082

(22) Filed: Apr. 24, 2012

(65) Prior Publication Data

US 2015/0161813 A1    Jun. 11, 2015

Related U.S. Application Data

(60) Provisional application No. 61/543,279, filed on Oct. 4, 2011.

(51) Int. Cl.
| | |
|---|---|
| G06T 15/20 | (2011.01) |
| G06T 1/60 | (2006.01) |
| G06T 13/20 | (2011.01) |
| G06T 15/50 | (2011.01) |

(52) U.S. Cl.
CPC ............. G06T 15/20 (2013.01); G06T 1/60 (2013.01); G06T 13/20 (2013.01); G06T 15/205 (2013.01); G06T 15/503 (2013.01); G06T 2210/62 (2013.01)

(58) Field of Classification Search
CPC ....... G06T 13/20; G06T 15/20; G06T 15/205; G06T 19/003; A63F 13/525–13/5258; A63F 2300/6661–2300/6684
USPC ........................................................ 345/420
See application file for complete search history.

(56) References Cited

U.S. PATENT DOCUMENTS

| | | | |
|---|---|---|---|
| 5,613,048 A * | 3/1997 | Chen et al. ................... | 345/419 |
| 5,977,977 A * | 11/1999 | Kajiya et al. ................. | 345/418 |
| 2002/0061131 A1* | 5/2002 | Sawhney .............. | G06T 7/0022 |
| | | | 382/154 |
| 2002/0171666 A1* | 11/2002 | Endo ....................... | G06T 13/00 |
| | | | 345/619 |

(Continued)

OTHER PUBLICATIONS

Pulli, Kari, et al. "View-based rendering: Visualizing real objects from scanned range and color data." Rendering techniques' 97. Springer Vienna, 1997. 23-34.*

*Primary Examiner* — Daniel Hajnik
(74) *Attorney, Agent, or Firm* — Lerner, David, Littenberg, Krumholz & Mentlik, LLP

(57) ABSTRACT

System and method for producing an intermediate image in three passes is provided. An initial image and a final image are identified, each image comprising an associated depth-map and corresponding to a respective camera pose from a respective angular heading. An intermediate image corresponding to an intermediate camera pose with an intermediate angular heading is rendered. A first intermediate image is rendered at a first opacity based on the final image and the associated final depthmap, a second intermediate image is rendered at a second opacity based on the initial image and the associated initial depthmap, and a third intermediate image is rendered at a third opacity based on the final image and the associated final depthmap. The rendered first, second, and third intermediate images, each of which correspond to the intermediate camera pose with the intermediate angular heading, are overlaid to produce a combined image for display.

20 Claims, 9 Drawing Sheets

(56) References Cited

U.S. PATENT DOCUMENTS

| | | | |
|---|---|---|---|
| 2005/0018045 A1* | 1/2005 | Thomas | G06K 9/209 348/157 |
| 2007/0086645 A1* | 4/2007 | Kim | G06K 9/20 382/154 |
| 2010/0225644 A1* | 9/2010 | Swope, III | G06T 13/00 345/419 |
| 2011/0199379 A1* | 8/2011 | Benien | G06T 15/20 345/427 |
| 2012/0147205 A1* | 6/2012 | Lelescu | H04N 13/0029 348/218.1 |
| 2012/0176379 A1* | 7/2012 | Farrer et al. | 345/420 |

\* cited by examiner

SYSTEMS AND METHOD FOR PERFORMING A THREE PASS RENDERING OF IMAGES

CROSS-REFERENCE TO RELATED APPLICATIONS

The present application claims the benefit of U.S. Provisional Patent Application Ser. No. 61/543,279, entitled "Systems and Method for Performing a Three Pass Rendering of Images," filed on Oct. 4, 2011, which is hereby incorporated by reference in its entirety for all purposes.

FIELD

The subject technology generally relates to rendering images used in mapping applications, and in particular, relates to systems and methods for rendering images used to animate changes in viewing orientation in mapping applications.

BACKGROUND

In order to create an animation, intermediate images may be produced by performing interpolation on two or more available images and associated three-dimensional (3D) information. Each of the intermediate images of the animation may be rendered by blending the two or more available images based on the associated three dimensional information.

SUMMARY

The disclosed subject matter relates to a computer-implemented method for performing interpolation on a first image and a second image in order to produce an intermediate image in three passes is provided. An initial image and a final image are identified, each image comprising an associated depthmap and corresponding to a respective camera pose from a respective angular heading. An intermediate image corresponding to an intermediate camera pose with an intermediate angular heading is rendered. A first intermediate image corresponding to the intermediate camera pose with the intermediate angular heading at a first opacity is rendered based on the final image and the associated final depthmap, and a second intermediate image corresponding to the intermediate camera pose with the intermediate angular heading at a second opacity is rendered based on the initial image and the associated initial depthmap, and a third intermediate image corresponding to the intermediate camera pose with the intermediate angular heading at a third opacity is rendered based on the final image and the associated final depthmap. The rendered first, second, and third intermediate images are overlaid to produce a combined image for display.

According to various aspects of the subject technology, a system including one or more processors and a machine-readable medium including instructions stored therein, which when executed by the processors, cause the processors to render intermediate images in three passes. An initial oblique view image and an associated initial depthmap of a target area corresponding to an initial camera pose, and a final oblique view image and an associated final depthmap of the target area corresponding to a final camera pose are received. The initial camera pose is different from the final camera pose. An intermediate oblique view image corresponding to an intermediate camera pose with an intermediate angular heading is rendered. The rendering includes (1) rendering a first intermediate oblique view image corresponding to the intermediate camera pose with the intermediate angular heading at 100% opacity based on the final oblique view image and the associated final depthmap; (2) rendering a second intermediate oblique view image corresponding to the intermediate camera pose with the intermediate angular heading at a first opacity based on the initial oblique view image and the associated initial depthmap; (3) rendering a third intermediate oblique view image corresponding to the intermediate camera pose with the intermediate angular heading at a second opacity based on the final oblique view image and the associated final depthmap; and (4) blending the rendered first, second, and third intermediate oblique view images to produce a combined image for display. When the intermediate angular heading of the intermediate oblique view image progresses from the initial angular heading to the final angular heading during a rendering of a plurality of intermediate oblique view images, the first opacity decreases and the second opacity increases for each subsequently rendered intermediate oblique view image.

The disclosed subject matter also relates to a machine-readable medium encoded with executable instructions for rendering intermediate images in three passes is provided. An initial image and an associated initial depthmap are identified, where the initial image corresponds to an initial camera pose with an initial angular heading. A final image and an associated final depthmap are further identified, where the final image corresponds to a final camera pose with a final angular heading. An intermediate image corresponding to an intermediate camera pose with an intermediate angular heading is rendered by: (1) rendering a first intermediate image corresponding to the intermediate camera pose with the intermediate angular heading at a first opacity based on the initial image and the associated initial depthmap into an off-screen buffer of a display area on a user device; (2) rendering a second intermediate image corresponding to the intermediate camera pose with the intermediate angular heading at a second opacity based on the final image and the associated final depthmap into the off-screen buffer of the display area on the user device; and (3) attaching the first and second intermediate images rendered into the off-screen buffer on the display area on the user device, and, for each pixel, blending the opacities of the first and second intermediate images based on the intermediate angular heading.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
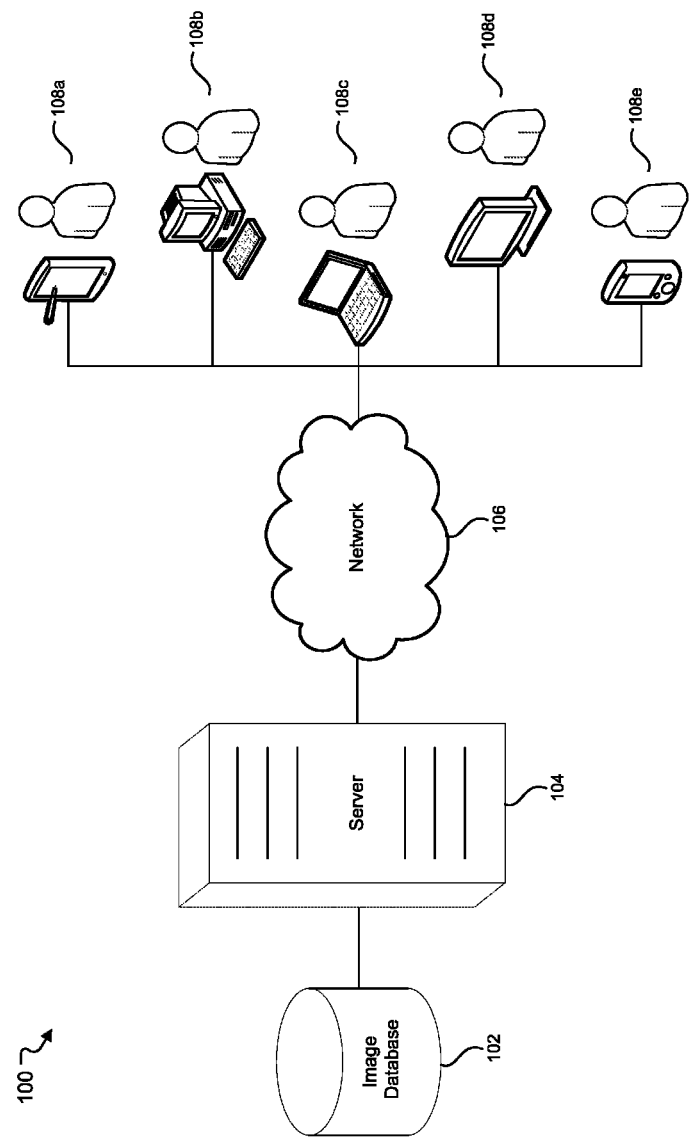
FIG. 1 illustrates an example of a system for serving/retrieving image data utilized to render intermediate images for animations that represent transitions between different viewing orientations, in accordance with various aspects of the subject technology.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

According to various aspects of the subject technology, a computer-implemented method for performing interpolation on a first image and a second image in order to produce an intermediate image in three passes is provided. An initial image and a final image are identified, each image comprising an associated depthmap and corresponding to a respective camera pose from a respective angular heading. An intermediate image corresponding to an intermediate camera pose with an intermediate angular heading is rendered. A first intermediate image corresponding to the intermediate camera pose with the intermediate angular heading at a first opacity is rendered based on the final image and the associated final depthmap, and a second intermediate image corresponding to the intermediate camera pose with the intermediate angular heading at a second opacity is rendered based on the initial image and the associated initial depthmap, and a third intermediate image corresponding to the intermediate camera pose with the intermediate angular heading at a third opacity is rendered based on the final image and the associated final depthmap. The rendered first, second, and third intermediate images are overlaid to produce a combined image for display.

Network environment 100 comprises one or more databases 102 (e.g., computer-readable storage devices) for storing a plurality of images associated with a plurality of target areas, and for storing a plurality of depthmaps corresponding to certain images. The stored images may include images corresponding to a variety of different elevation orientations (e.g., nadir view, oblique aerial view, street view etc.) and a variety of different directional headings. The stored depthmaps may be associated with images to provide renderings of different viewing orientations (e.g., oblique aerial view images, street view images, etc.).

The network environment 100 further comprises one or more servers 104. Server 104 may receive requests from user-operated client devices 108a-108e. Server 104 and client devices 108a-108e may be communicatively coupled through a network 106. Client devices 108a-108e may request data from server 104. Upon receiving the request, server 104 may retrieve a set of associated images and depthmaps from image database 102 and serve the set of associated images to client devices 108a-108e. In some implementations, client devices 108a-e process the images provided from image database 102 through the server 104 to generate the animation. In some implementations, certain computations may be performed on server 104, and the processed image information served to client devices 108.

Each of client devices 108a-108e can represent various forms of processing devices. Example processing devices can include a desktop computer, a laptop computer, a handheld computer, a television with one or more processors attached or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
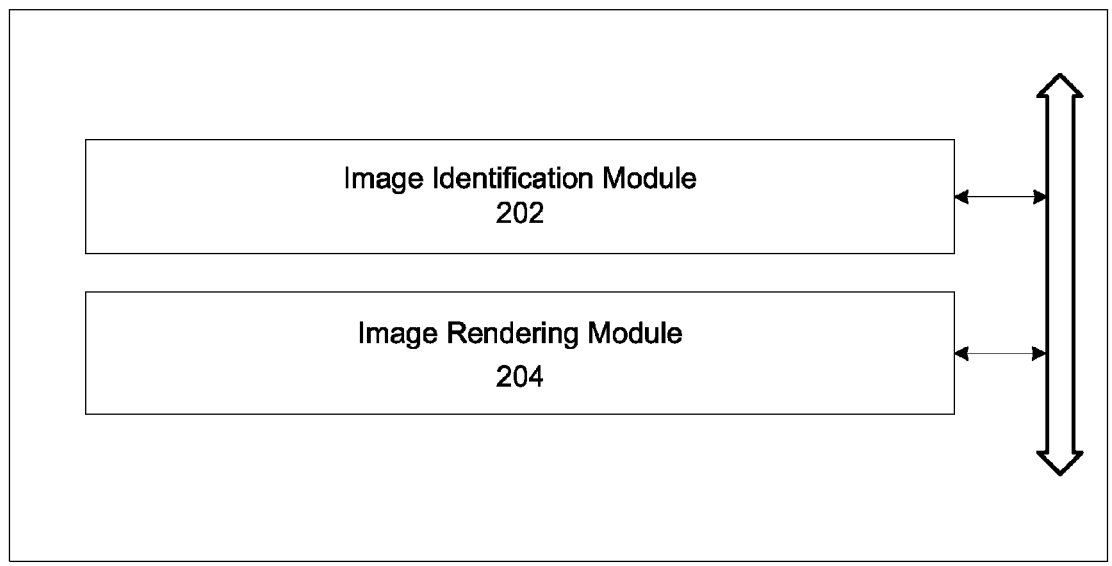
FIG. 2 illustrates an example of a system for rendering, in three passes, images used in animating transitions between different viewing orientations, in accordance with various aspects of the subject technology.

FIG. 2 illustrates an example of a system utilized for rendering, in three rendering passes, images for generating the animation, in accordance with various aspects of the subject technology. A plurality of intermediate images representing a sequence of camera poses along a navigational path may be rendered to generate an animation along the navigational path. Each of the plurality of intermediate images are rendered by performing an interpolation on the initial and final images in three separate passes. System 200 includes image identification module 202 configured to identify an initial image and a depthmap associated with the initial image of the target area corresponding to an initial camera pose. Image identification module is also configured to identify a final image and a depthmap associated with the final image of the target area corresponding to a final camera pose. The client device further comprises an image rendering module 204 that is in communication with image identification module 202. Image rendering module 204 may be configured to render a plurality of intermediate images, in three rendering passes, representing a plurality of intermediate camera poses directed at the target area. Each intermediate image is rendered based on 3D information provided by the depthmaps and each intermediate image is rendered with a blend of different opacities of the initial and final images.

In some aspects, the modules may be implemented in software (e.g., subroutines and code). The software implementation of the modules may operate on web browsers that generates interactive 3D graphics (e.g., by using Web-based Graphics Library, Cascading Style Sheets animation, etc.) running on client devices 108. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3A:
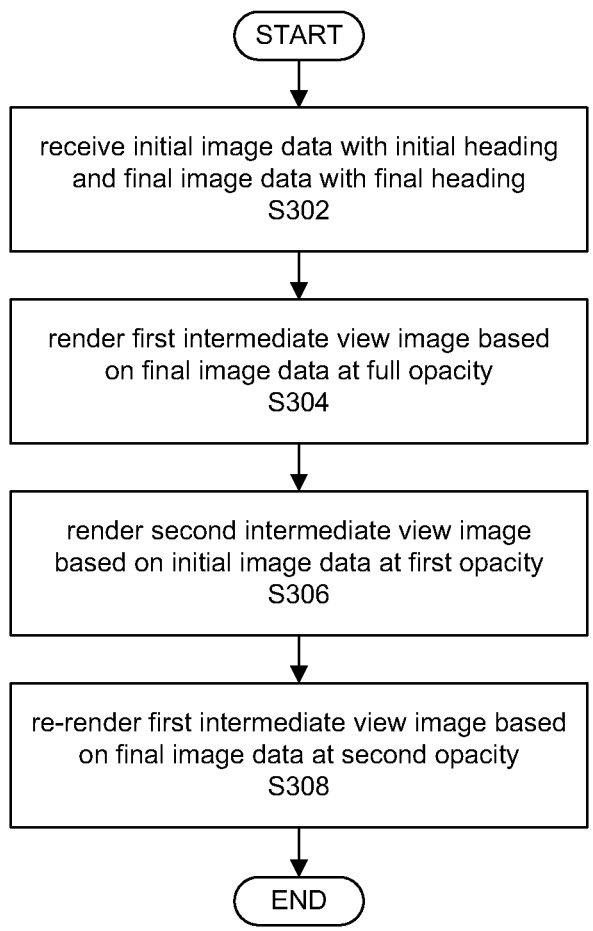
FIGS. 3a and 3b illustrate example methods for rendering, in three passes, images used in animating a transition between different viewing orientations, in accordance with various aspects of the subject technology.
Figure 3B:
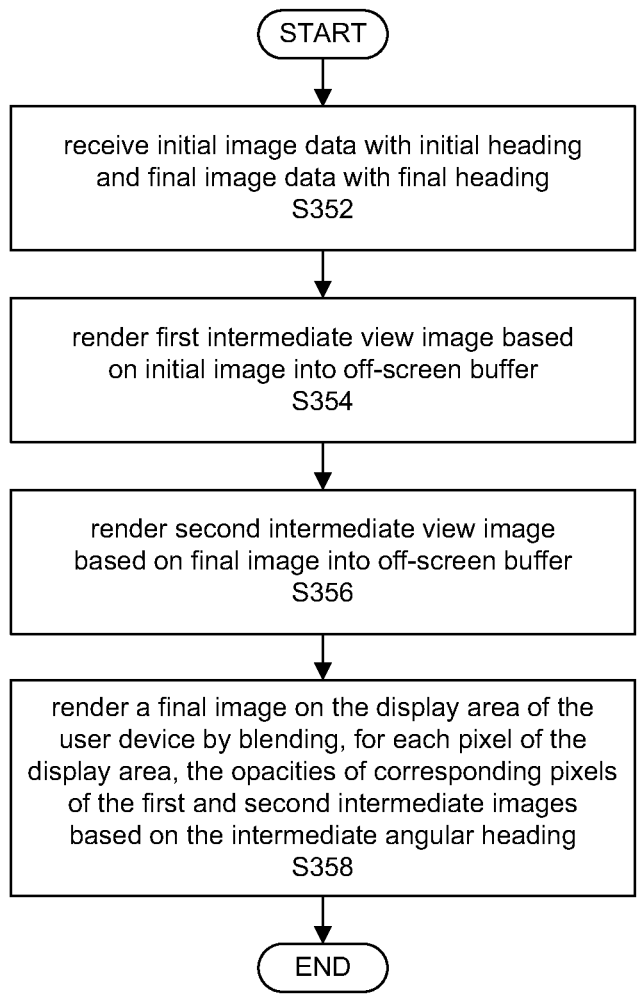
Figure 4:
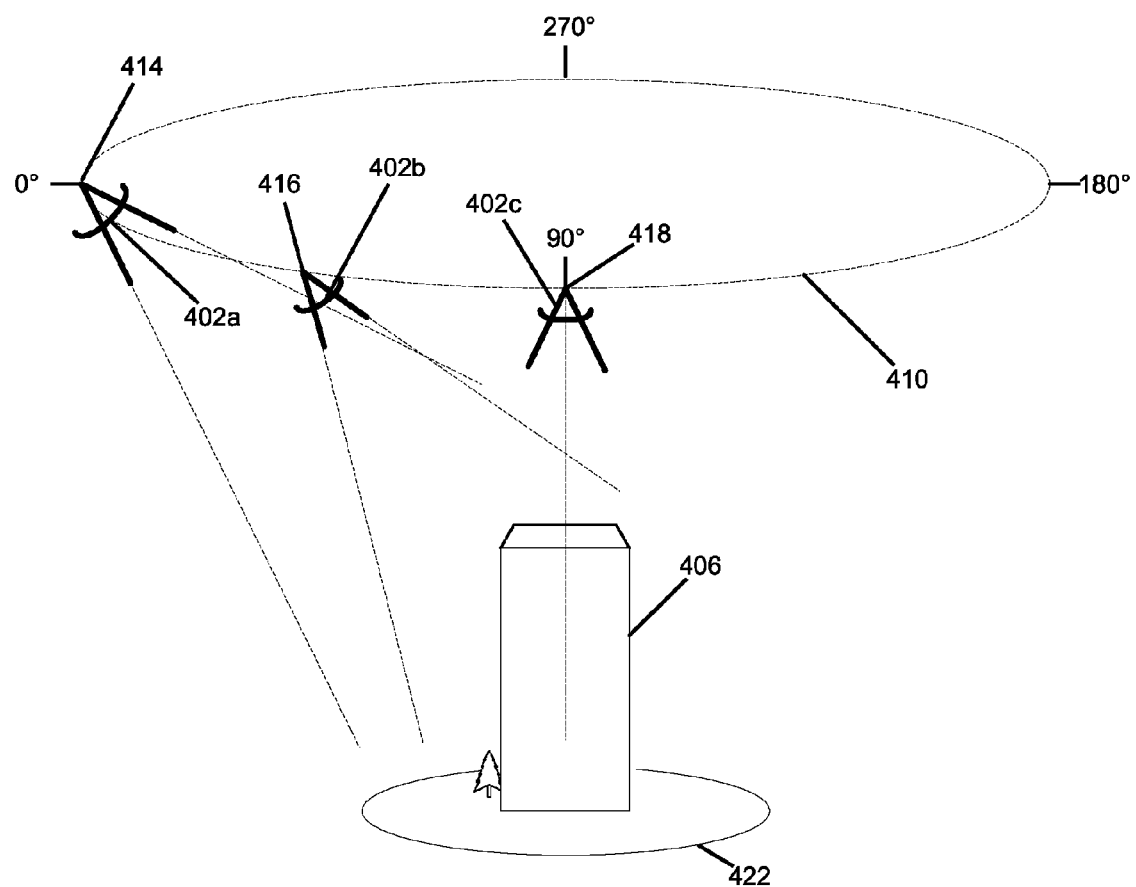
FIG. 4 provides a graphical representation of camera poses for which an animation is generated, in accordance with various aspects of the subject technology.

FIG. 3 illustrates an example of method 300 for rendering, in three rendering passes, the plurality of intermediate images utilized to animate a transition in views, in accordance with various aspects of the subject technology. FIG. 4 provides a graphical representation of camera poses 402a-402c for which the animation may be generated. While FIG. 4 illustrates an example that includes three camera poses, numerous additional camera poses along the navigational path may be represented in the animation. Each camera pose may correspond to an intermediate image. Camera poses 402a-402c are illustrated as progressing along navigational path 410 between two discrete views. For example, FIG. 4 illustrates a progression from the initial image at the initial heading (e.g., at position 414) to the final image at the final heading (e.g., at position 418), in accordance with various aspects of the subject technology. In this exemplary implementation, the initial and final headings are separated by 90°. In some implementations, the separation between initial and final heading may be a value greater than or less than 90°.

Figure 5A:
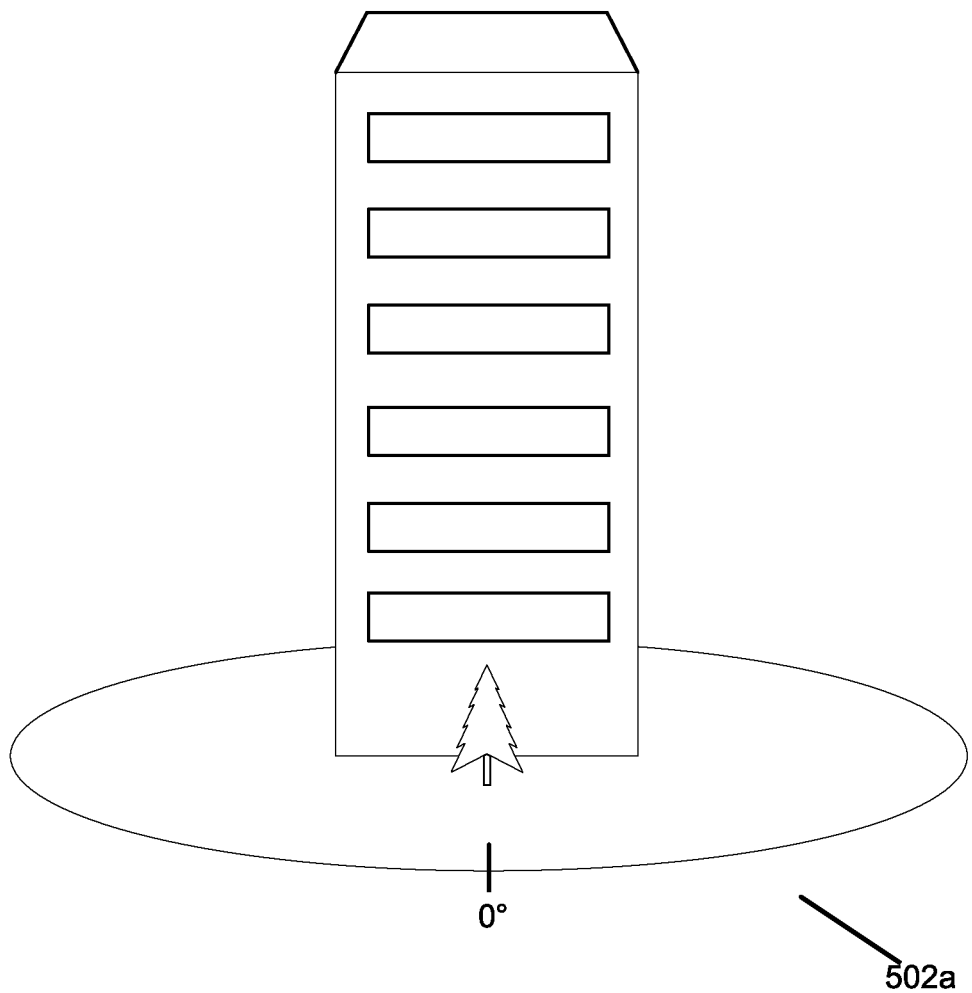
FIGS. 5a-5c illustrate example images of a target area corresponding to multiple camera poses along a navigational path, in accordance with various aspects of the subject technology.
Figure 5B:
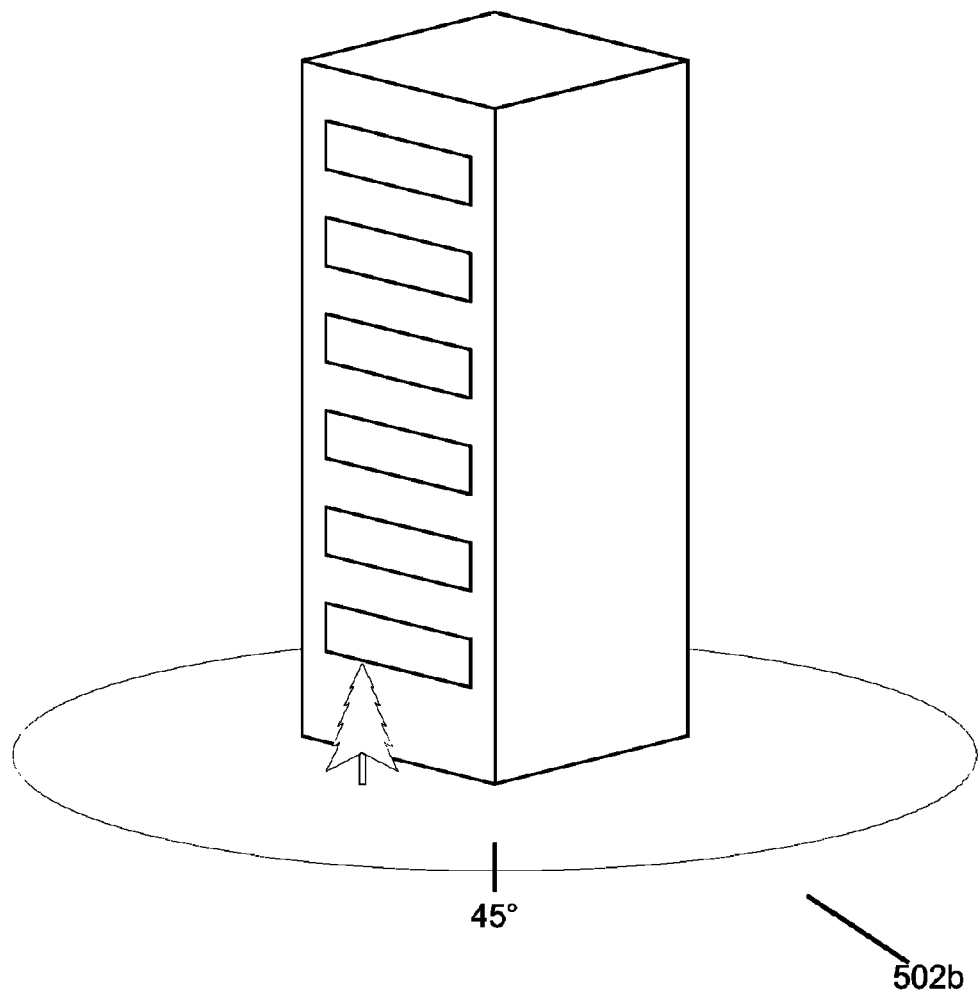
Figure 5C:
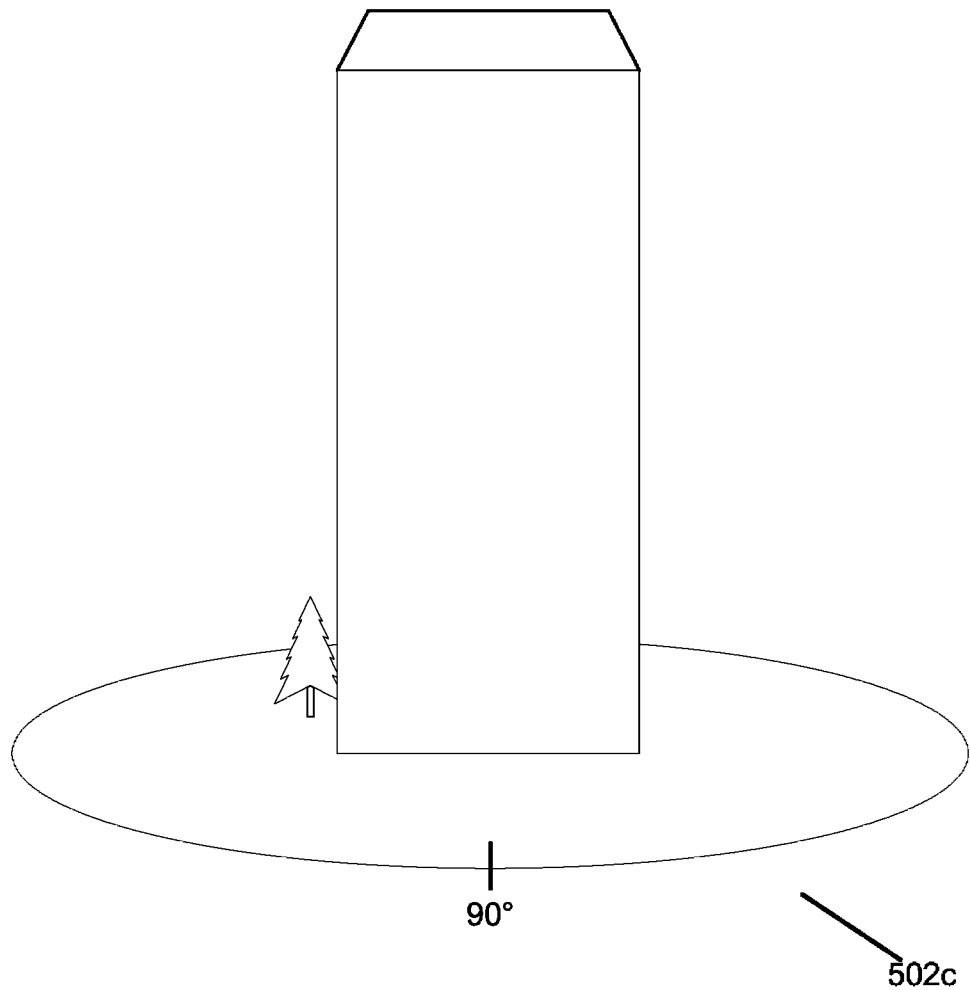

Returning to FIGS. 2 and 3, image identification module 202 may, upon receiving a user command to transition from an initial image of an initial heading to a final image of a final heading, identify the initial image and an associated initial depthmap corresponding to an initial camera pose, according to S302 and S352. FIGS. 5a-5c illustrate example images of target area 406 at various stages of the animation. The example images correspond to camera poses 402a-402c and depict a progression along navigational path 410, in accordance with various aspects of the subject technology. While FIG. 5 provides only three example images of the animation, numerous additional images may be rendered to improve the quality of the animation.

As shown in FIGS. 4 and 5a, initial image 502a represents an image corresponding to the initial image at the initial heading 414. That is, initial image 502a of target area 406 may represent the initial camera pose 402a including an initial orientation. The initial image data (including an initial depthmap) may be received by image identification module 202 in S302 and S352. The initial depthmap may provide depth information of a target area from which an initial 3D mesh model may be generated.

As shown in FIGS. 4 and 5c, final image 502c represents an image corresponding to the final image at the final heading 418. That is, final image 502c of target area 406 may represent the final camera pose 402c including a final orientation. The final image data (including a final depthmap) may also be received by image identification module 202 in S302 and S352. The final depthmap may provide depth information of a target area from which a final 3D mesh model may be generated.

According to certain aspects, each of a plurality of intermediate images representing a plurality of intermediate camera poses may be rendered from the initial image data and the final image data received by image identification module 202. For example, intermediate image 502b, which corresponds to intermediate heading 416, may be rendered from the initial and final mesh models generated from the depthmaps. Each mesh model, however, may comprise limited 3D information because the depthmaps from which they are generated provide depth information from a single perspective. Thus, as the orientation of rendered images changes, problem areas of the mesh models may appear. For example, a problem area may include hidden surfaces (e.g., a surface in 3D space that is not visible from a viewing orientation) in an image. As the orientation of a rendered image is shifted, a previously hidden surface (i.e., a surface that is not viewable from a previous orientation) in 3D space may be exposed. The mesh model, however, may not include any information on the hidden surface. Consequently, problem areas may arise.

Certain problem areas associated with rendering images of different orientations from 3D models may be detected by identifying depth boundaries. Depth boundaries may be identified as neighboring pixels on the depthmap that represent differences in depth values beyond a predetermined threshold. Depth boundaries may also be identified by polygons of a mesh model that stretch beyond an aspect ratio threshold when the orientation is changed. In some implementations, the 3D mesh model is presented as a plurality of triangles of different sizes and orientations to represent a 3D structure. Thus, problem areas may also be identified as triangles. In some implementations, a polygon other than a triangle may be used to construct the 3D mesh model.

In order to minimize the visual impact of problem areas, polygons (i.e., triangles) along depth boundaries may be broken as their aspect ratios change with a change in orientation. That is, polygons formed by connecting neighboring pixels with a difference in depth values beyond a predetermined threshold may be faded out by modifying the opacity at which they are rendered in each intermediate image as the polygon is stretched out. For example, a problem area may become more evident in the middle of a transition from the initial image to the final image as polygons of the problem area may become stretched out with the change in orientation. As the polygons of the problem area becomes stretched out, their opacities may be modified to become less opaque (e.g., approach 0%) in order to minimize the visual impact of the problem area. As the polygons of the problem area become less stretched out (e.g., when the camera pose represented in the intermediate image approaches the camera pose of the final image), the final image may be rendered at a higher opacity.

In some implementations, the opacities of polygons of problem areas may be faded out (e.g., changed from 100% to 0%) at a quicker rate than normal polygons as the transition progresses from the initial image towards a middle section of the transition (e.g., halfway between the initial image and the final image). For example, for a portion of the transition from the initial image to the final image, the opacity of the first image may be faded from 100% to 0% for a polygon in a trouble area while the opacity of the first image may be fade from 100% to 75% for a normal polygon. Similarly, the opacities of polygons of problem areas may be faded in (e.g., changed from 0% to 100%) at a quicker rate than normal polygons as the transition progresses from a middle section of the transition towards the final image. That is, for a portion of the transition from the initial image to the final image the opacity of the first image may be faded from 0% to 100% for a polygon in a trouble area while the opacity of the first image may be fade from 75% to 100% for a normal polygon.

The three pass rendering of intermediate images may be utilized to minimize the visual impact the problem areas described above. In some implementations of the three pass rendering, a first intermediate view rendering may be rendered based on the final image at full opacity, according to S304. Since the final image represents the end image of the animation, rendering the first intermediate image at full opacity provides a baseline canvas over which additionally rendered images of varying opacities may be overlaid.

In a second pass, a second intermediate view rendering may be rendered based on the initial image at a first opacity, according to S306. The second image may be rendered to remove (e.g., fade out the opacity) any identified problem areas. For example, if a polygon corresponding to a depth boundary is identified in the second image, the polygon may be removed by setting the opacity of the polygon to approach 0% as the rendering of intermediate images approaches sections where trouble areas arise (e.g., middle sections of a transition). By removing the polygons, pixels corresponding to problem area may be omitted from contributing to the rendering of the intermediate image. The remaining pixels of the second image may be set to a first opacity.

In a third pass, the first intermediate view rendering may be re-rendered based on the final image at a second opacity, according to S308. The re-rendered image may be rendered similarly to the second image. That is, the re-rendered first image may be rendered by removing any polygons associated with identified problem areas. For example, a polygon corresponding to a depth boundary may be removed by setting the opacity of the polygon to approach 0% as the rendering of intermediate images approaches sections where trouble areas arise (e.g., middle sections of a transition). The remaining pixels of the first image may be set to a second opacity.

In some implementations of the three pass rendering, the utilization of the initial image and the final image may be switched. For example, a first intermediate view may be rendered based on the initial image at full opacity in the first pass. Rendering the initial image at full opacity provides a baseline canvas over which additionally rendered images of varying opacities may be overlaid. In the second pass, a second intermediate view rendering may be rendered based on the final image at a first opacity. As described above, the second image may be rendered to remove any identified problem areas and to set the remaining pixels of the second image to a first opacity. In the third pass, the first intermediate view rendering may be re-rendered based on the initial image at a second opacity. The re-rendered image may be rendered similarly to the second image. That is, the re-rendered first image may be rendered by removing any polygons associated with identified problem areas. The remaining pixels of the first image may be set to a second opacity.

As described above, the plurality of intermediate images may be associated with camera poses at distinct locations along a navigational path between the initial and the final camera poses represented by the initial and final images. Accordingly, the opacity of each image rendered to form the intermediate image may vary depending on the location along the navigational path associated with the intermediate image. For example, the opacity of the rendered second image and the re-rendered first image may be determined based to the camera pose represented in the intermediate image.

By generated intermediate images with images of varying opacities, the image rendering module 204 may utilize the best available information in forming the intermediate image. For example, the first opacity and the second opacity may be determined based to the camera pose represented in the intermediate image such that the closer the camera pose represented in intermediate image is to the camera pose of the initial image, the higher the first opacity will be set, and the lower the second opacity will be set. Conversely, the closer the camera pose represented in the intermediate image is to the camera pose of the final image, the lower the first opacity will be set, and the higher the second opacity will be set. Furthermore, omitting the problem areas in the second and third passes may help minimize the impact of problem areas by omitting them from the rendering of the intermediate image altogether.

Accordingly, as the camera pose represented in the intermediate image progresses along navigational path from the camera pose to the initial image to the camera pose of the final image, the first and second opacities are crossfaded with one another (e.g., the first opacity will transition from 100% to 0% and the second opacity will transition from 0% to 100%). In some aspects, the crossfade of the first and second opacities may be linear with respect to the progression along the navigational path; however, in other aspects, the crossfade of opacities may be set to be non-linear. Furthermore, by omitting the identified problem areas in the second and third passes, the three pass rendering may minimize the effect of the problem areas by using image data available to texturize the intermediate image.

In some implementations of the three pass rendering, each of the first image and the second image may be independently rendered to an off-screen buffer. In the first pass, the first image may be rendered, based on the initial image, to the off-screen buffer, according to S354. In the second pass, the second image may be rendered, based on the final image, to the off-screen buffer, according to S356. Each of the two renderings may have the same size as a user's display area (to which the final intermediate image is rendered). In the third pass, the final intermediate image is rendered on the display area of the user device by blending, for each pixel of the display area, the opacities of corresponding pixels of the first and second intermediate images based on the intermediate angular heading, according to S358.

In some aspects, the first and second images may be blended on a pixel by pixel basis. For example, a pixel from the first image at a first opacity may be combined with a corresponding pixel from the second image at a second opacity. The first opacity of the pixel from the first image and the second opacity of the corresponding pixel from the second image may vary depending on the angular heading corresponding to the location along the navigational path associated with the intermediate image. That is, the first and second opacities of each pixel may be determined based to the camera pose represented in the intermediate image such that the closer the camera pose represented in intermediate image is to the camera pose of the initial image, the higher the opacity of a pixel from the first image may be set, and the lower the opacity of a corresponding pixel from the second image may be set. Conversely, the closer the camera pose represented in the intermediate image is to the camera pose of the final image, the lower the opacity of a pixel from the first image may be set, and the higher the opacity of a corresponding pixel from the second image may be set.

Furthermore, in order to minimize the effect of the problem areas, pixels corresponding to problem areas in the first image may be set to an opacity of 0%, while the corresponding pixels of the second image may be set to an opacity of 100%. Conversely, pixels corresponding to problem areas in the second image may be set to an opacity of 0%, while the corresponding pixels of the first image may be set to an opacity of 100%. Additionally, pixels corresponding to overlapping problem areas of both the first and second images may be blended at their original values (prior to being identified as a problem area and removed). In some implementations, an additional rendering pass using information from a nadir view (i.e., satellite) image may be used to provide image data on overlapping problem areas.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
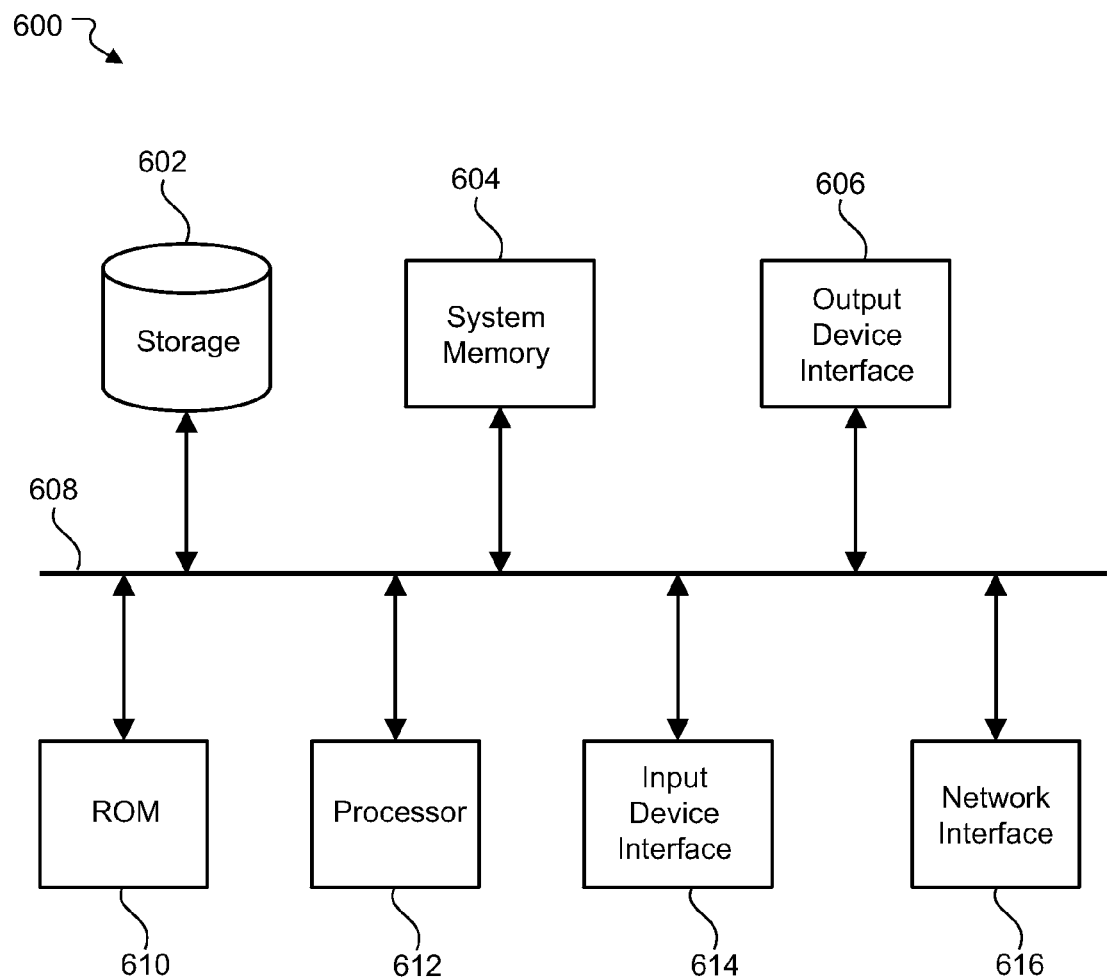
FIG. 6 is a block diagram illustrating components of a controller, in accordance with various aspects of the subject disclosure.

FIG. 6 conceptually illustrates an example electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for rendering images using three passes. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interface 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers, such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A machine-implemented method of performing interpolation on a first image and a second image in order to produce an intermediate image, the method comprising:
    identifying an initial image and an associated initial depthmap, the initial image corresponding to an initial camera pose with an initial angular heading;
    identifying a final image and an associated final depthmap, the final image corresponding to a final camera pose with a final angular heading;
    rendering an intermediate image corresponding to an intermediate camera pose with an intermediate angular heading, the rendering comprising:
    rendering a first intermediate image corresponding to the intermediate camera pose with the intermediate angular heading at a first opacity based on the final image and the associated final depthmap;
    rendering a second intermediate image corresponding to the intermediate camera pose with the intermediate angular heading at a second opacity based on the initial image and the associated initial depthmap;
    rendering a third intermediate image corresponding to the intermediate camera pose with the intermediate angular heading at a third opacity based on the final image and the associated final depthmap; and
    overlaying the rendered first, second, and third intermediate images to produce the intermediate image for display.

2. The machine-implemented method of claim 1, wherein:
    rendering the first intermediate image based on the final image and the associated final depthmap comprises generating a first mesh model based on the final depthmap;
    rendering the second intermediate image based on the initial image and the associated initial depthmap comprises generating a second mesh model based on the initial depthmap; and
    rendering the third intermediate image based on the final image and the associated final depthmap comprises generating a third mesh model based on the final depthmap,
    each of the first, second, and third mesh models provide three-dimensional information from a perspective corresponding to the intermediate angular heading.

3. The machine-implemented method of claim 2, wherein each of the first, second, and third mesh models is constructed as a plurality of polygons, the plurality of polygons representing a surface of the mesh model.

4. The machine-implemented method of claim 3, wherein each of the plurality of polygons is a triangle.

5. The machine-implemented method of claim 3, wherein rendering the intermediate image corresponding to an intermediate camera pose with the intermediate angular heading further comprises detecting problem areas associated with the intermediate image, each problem area being included in one or more of the plurality of polygons.

6. The machine-implemented method of claim 5, wherein detecting the problem areas comprises identifying depth boundaries, wherein depth boundaries are identified as neighboring pixels on a depthmap having differences in depth values beyond a predetermined threshold.

7. The machine-implemented method of claim 6, wherein having differences in the depth values beyond the predetermined threshold causes a reduction in opacities corresponding to detected problem areas in order to minimize visual impacts of the problem areas.

8. The machine-implemented method of claim 7, wherein when the intermediate angular heading of the intermediate image progresses from the initial angular heading to the final angular heading during a rendering of a plurality of intermediate images, an increase in a size of a polygon that includes a problem area in a subsequently rendered intermediate image causes a decrease in an opacity of the polygon in the subsequently rendered intermediate image.

9. The machine-implemented method of claim 1, wherein the first opacity is 100% opaque, and wherein the second opacity is negatively correlated with the third opacity.

10. The machine-implemented method of claim 9, wherein when the intermediate angular heading of the intermediate image progresses from the initial angular heading to the final angular heading during a rendering of a plurality of intermediate images, the second opacity decreases and the third opacity increases for each subsequently rendered intermediate image.

11. A non-transitory computer-readable medium comprising instructions stored therein, which when executed by a system, cause the system to perform operations comprising:
    identifying an initial image and an associated initial depthmap, the initial image corresponding to an initial camera pose with an initial angular heading;
    identifying a final image and an associated final depthmap, the final image corresponding to a final camera pose with a final angular heading;
    rendering an intermediate image corresponding to an intermediate camera pose with an intermediate angular heading, the rendering comprising:
    rendering a first intermediate image corresponding to the intermediate camera pose with the intermediate angular heading at a first opacity based on the initial image and the associated initial depthmap into an off-screen buffer of a display area of a user device;
    rendering a second intermediate image corresponding to the intermediate camera pose with the intermediate angular heading at a second opacity based on the final image and the associated final depthmap into the off-screen buffer of the display area of the user device; and
    rendering a third intermediate image corresponding to the intermediate camera pose with the intermediate angular heading at a third opacity based on the final image and the associated final depthmap; and rendering the intermediate image on the display area of the user device by blending, for each pixel of the display area, the opacities of corresponding pixels of the first, second, and third intermediate images based on the intermediate angular heading.

12. The non-transitory computer-readable medium of claim 11, wherein the first and second opacities are determined based on the intermediate angular heading corresponding to the intermediate camera pose.

13. The non-transitory computer-readable medium of claim 12, wherein when the intermediate angular heading of the intermediate image progresses from the initial angular heading to the final angular heading during a rendering of a plurality of intermediate images, the first opacity decreases and the second opacity increases for each subsequently rendered intermediate image.

14. The non-transitory computer-readable medium of claim 11, wherein:
rendering the first intermediate image based on the initial image and the associated initial depthmap comprises generating a first mesh model; and
rendering the second intermediate image based on the final image and the associated final depthmap comprises generating a second mesh model,
each of the first and second mesh models providing three-dimensional information from a perspective corresponding to the intermediate angular heading.

15. The non-transitory computer-readable medium of claim 11, wherein rendering each of the first and second intermediate images further comprises detecting problem areas, each problem area being associated with one or more pixels of a respective intermediate image.

16. The non-transitory computer-readable medium of claim 15, wherein detecting the problem areas comprise identifying depth boundaries, and wherein depth boundaries are identified as neighboring pixels on a depthmap having differences in depth values beyond a predetermined threshold.

17. The non-transitory computer-readable medium of claim 16, wherein having differences in the depth values beyond the predetermined threshold causes a reduction in opacities corresponding to pixels associated with detected problem areas in order to minimize visual impacts of the problem areas.

18. A system for performing interpolation on a first oblique view image and a second oblique view image in order to produce an intermediate oblique view image, the system comprising:
one or more processors; and
a machine-readable medium comprising instructions stored therein, which when executed by the processors, cause the processors to perform operations comprising:
receiving an initial oblique view image and an associated initial depthmap of a target area corresponding to an initial camera pose;
receiving a final oblique view image and an associated final depthmap of the target area corresponding to a final camera pose, wherein the initial camera pose is different from the final camera pose; and
rendering an intermediate oblique view image corresponding to an intermediate camera pose with an intermediate angular heading, the rendering comprising:

rendering a first intermediate oblique view image corresponding to the intermediate camera pose with the intermediate angular heading at 100% opacity based on the final oblique view image and the associated final depthmap;
rendering a second intermediate oblique view image corresponding to the intermediate camera pose with the intermediate angular heading at a first opacity based on the initial oblique view image and the associated initial depthmap;
rendering a third intermediate oblique view image corresponding to the intermediate camera pose with the intermediate angular heading at a second opacity based on the final oblique view image and the associated final depthmap; and
blending the rendered first, second, and third intermediate oblique view images to produce the intermediate oblique view image for display,
wherein when the intermediate angular heading of the intermediate oblique view image progresses from the initial angular heading to the final angular heading during a rendering of a plurality of intermediate oblique view images, the first opacity decreases and the second opacity increases for each subsequently rendered intermediate oblique view image.

19. The system of claim 18, wherein:
rendering the first intermediate oblique view image based on the final image and the associated final depthmap comprises generating a first mesh model;
rendering the second intermediate oblique view image based on the initial image and the associated initial depthmap comprises generating a second mesh model; and
rendering the third intermediate oblique view image based on the final image and the associated final depthmap comprises generating a third mesh model,
each of the first, second, and third mesh models being constructed as a plurality of polygons, the plurality of polygons representing a surface of the mesh model and providing three-dimensional information from a perspective corresponding to the intermediate angular heading.

20. The system of claim 19, wherein rendering the intermediate oblique view image corresponding to an intermediate camera pose with the intermediate angular heading further comprises detecting problem areas associated with the intermediate oblique view image, each problem area being included in one or more of a plurality of polygons, and
wherein when the intermediate angular heading of the intermediate oblique view image progresses from the initial angular heading to the final angular heading during a rendering of a plurality of intermediate oblique view images, an increase in a size of a polygon that includes a problem area in a subsequently rendered intermediate oblique view image causes a decrease in an opacity of the polygon that includes the problem area in the subsequently rendered intermediate oblique view image.

* * * * *